United States Patent [19]
Albert

[11] 3,844,683
[45] Oct. 29, 1974

[54] APPARATUS AND METHOD FOR CONTROLLED LIQUID TRANSFER

[75] Inventor: Don E. Albert, Bartlesville, Okla.
[73] Assignee: Phillips Petroleum, Bartlesville, Okla.
[22] Filed: Sept. 28, 1972
[21] Appl. No.: 292,901

[52] U.S. Cl.................................. 417/6, 417/7
[51] Int. Cl............................... F04b 41/06
[58] Field of Search .................... 417/5, 7, 6, 8

[56] References Cited
UNITED STATES PATENTS
2,741,986   4/1956   Smith........................................ 417/7
2,803,192   8/1957   Crabtree................................... 417/7
3,744,932   7/1973   Prevett..................................... 417/8

*Primary Examiner*—William L. Freeh
*Assistant Examiner*—Richard Sher

[57] ABSTRACT

An apparatus and method for delivering a liquid to a plurality of outlets while automatically maintaining a liquid flow rate from each outlet within a preselected range during variations in the total rate of liquid being discharged from the outlets. The flow rate of the liquid is measured and pumps of the system are controllably actuated and their operation terminated in response and relative to the discharge rate of liquid from the outlets.

8 Claims, 4 Drawing Figures

APPARATUS AND METHOD FOR CONTROLLED LIQUID TRANSFER

In liquid transfer systems, such as a multiple aircraft refueling system, for example, it is desirable to assure that the liquid flow rate from each outlet of the system is maintained within a preselected range during variations in the total rate of liquid being discharged from the outlets. Systems have been discovered which will sequentially actuate and terminate multiple pumps in an effort to maintain a desired flow rate from each outlet. It has been discovered, however, that if one of the pumps in the sequence is inoperable for various reasons, such as repair, and that pump is called upon for increasing the total flow rate, then the heretofore know systems will not automatically function to fulfill the demand.

This invention therefore resides in an apparatus and method for delivering a liquid to a plurality of outlets while automatically maintaining the liquid flow rate of each outlet within a preselected range during variations in the total rate of liquid being discharged from the outlets. The flow rate of the liquid is measured and pumps of the system are controllably actuated and their operation terminated in response to and relative to the discharge rate of liquid from the outlets.

Other aspects, objects, and advantages of the present invention will become apparent from a study of the disclosure, the appended claims, and the drawings.

The drawings are diagrammatic views of this invention.

Figure 1:
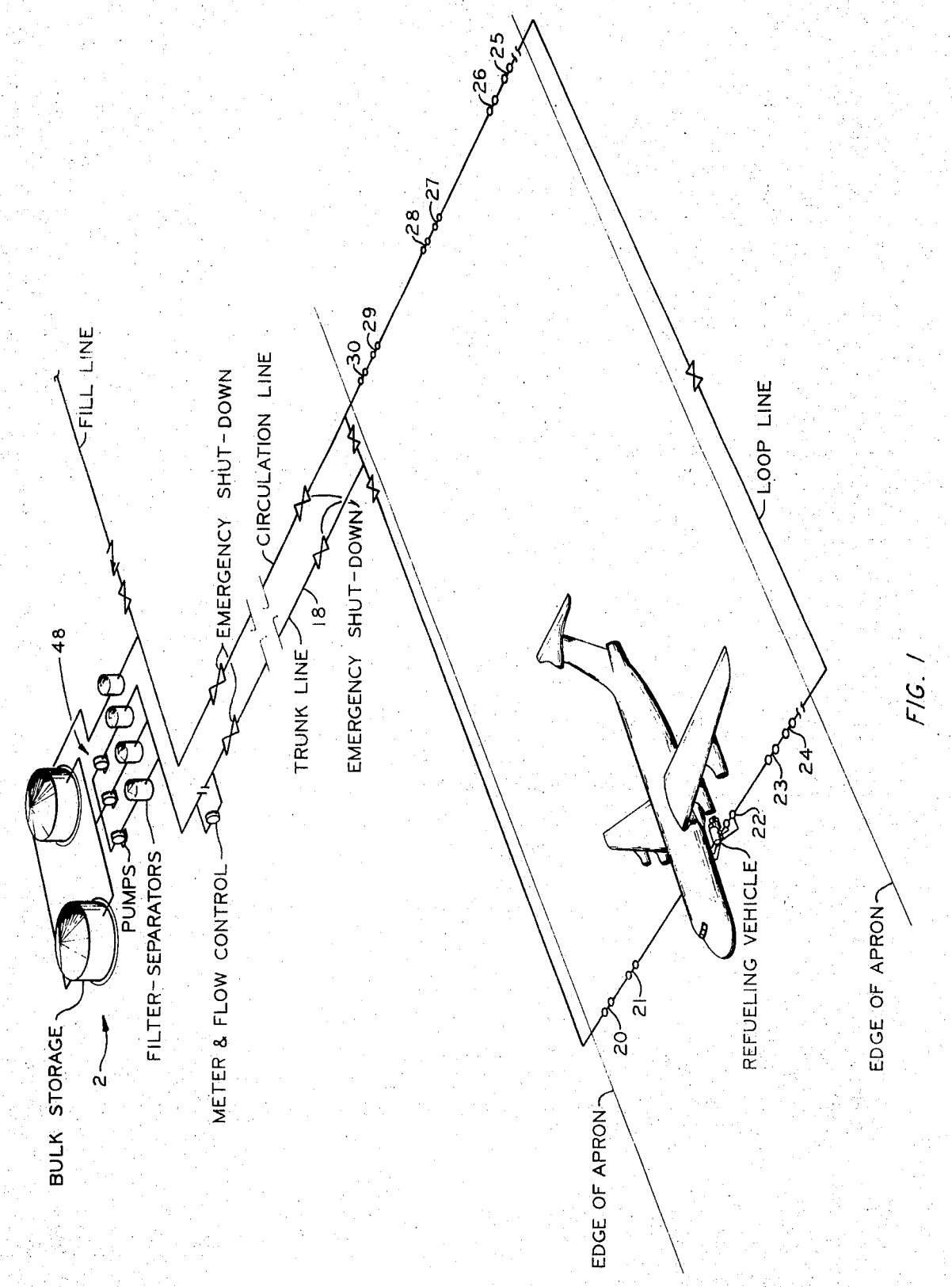
Figure 2:
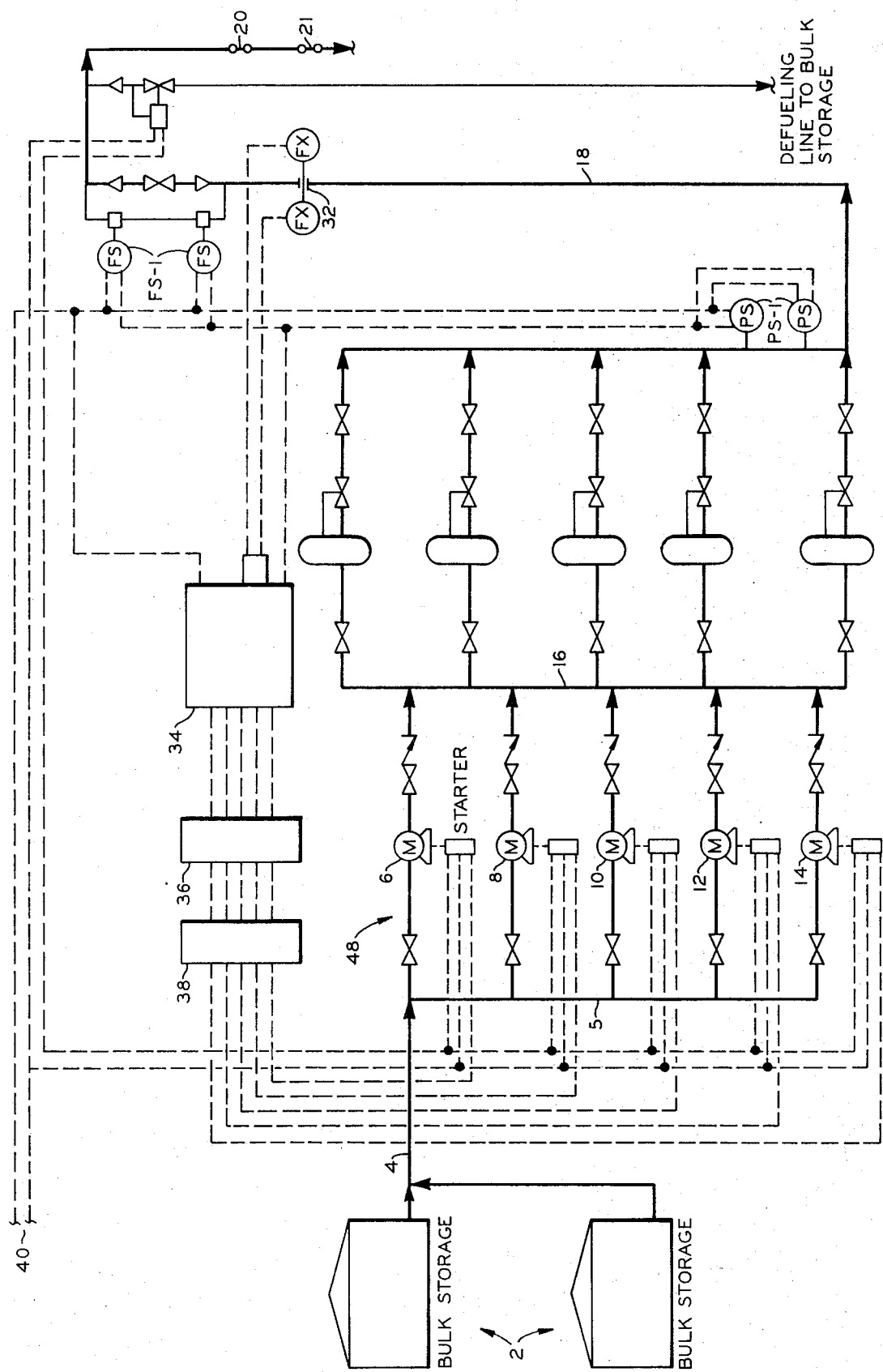
Figure 3A:
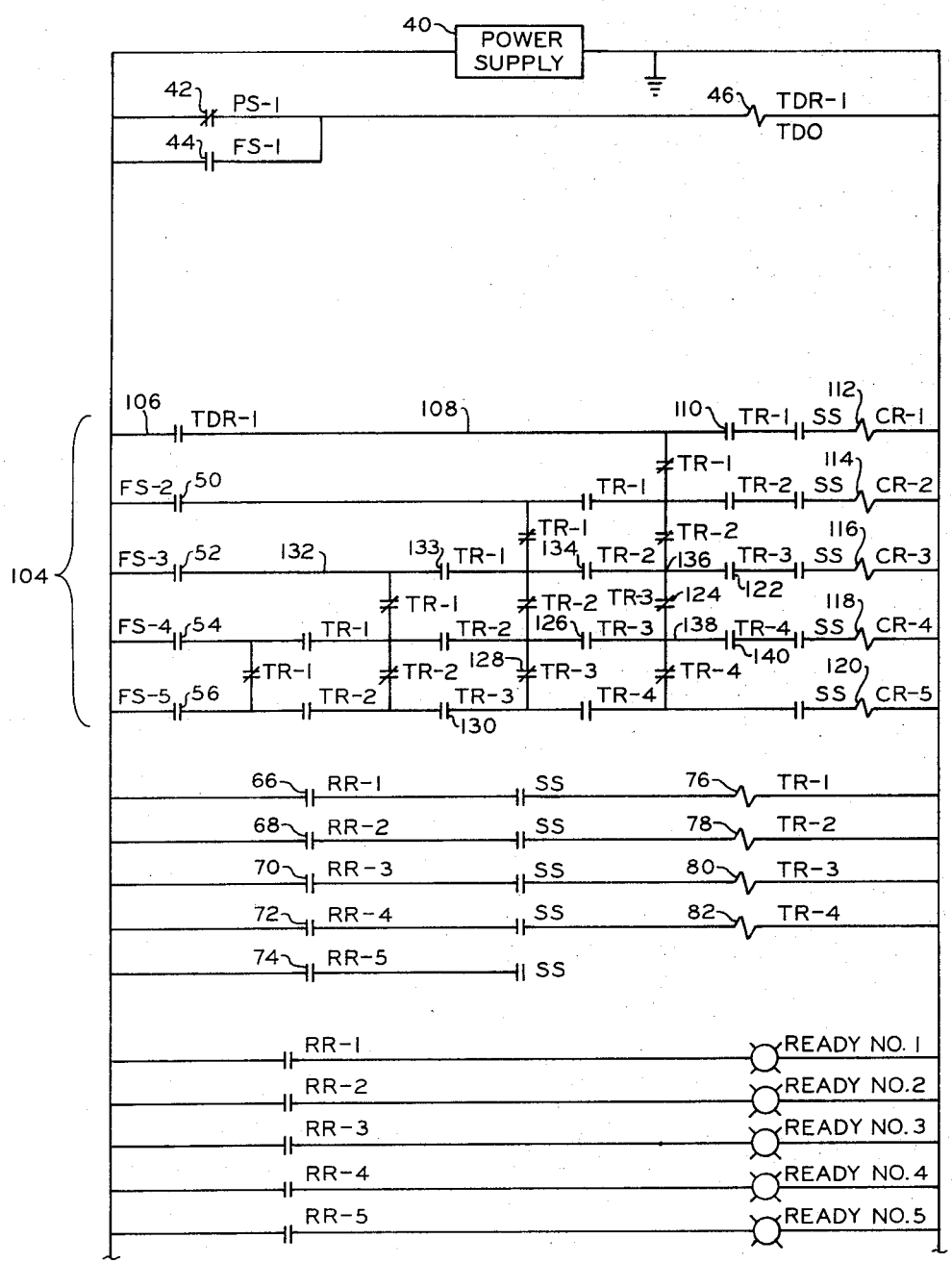
Figure 3B:
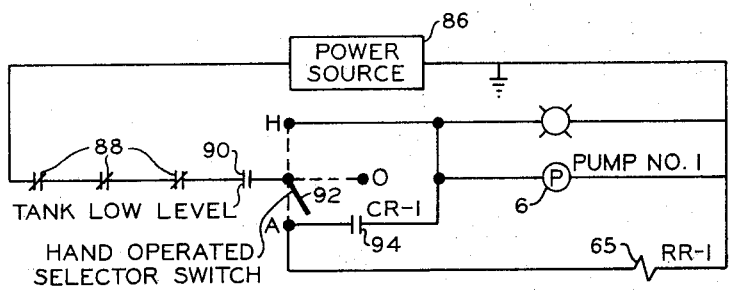

FIG. 1 shows a general view of a fuel transfer system upon which this invention can be utilized, FIG. 2 shows a more detailed view of a portion of the system, and FIGS. 3A and 3B show electrical circuit diagrams of the invention.

Referring to FIGS. 1 and 2, a liquid supply source 2 such as bulk storage tanks, for example, is connected by conduit 4 and header 5 to a plurality of pumps 6, 8, 10, 12 and 14, for example. The discharge of the pumps 6, 8, 10, 12 and 14 are connected via header 16 and conduit 18 to a plurality of outlets 20–30. A flow measuring element 32 is positioned in conduit 18 for measuring the flow rate of liquid passing to the outlets 20–30 from the pumps 6, 8, 10, 12 and 14, and delivering a first signal representative of and in response to that measured flow rate. As will be later more fully described, means are provided for actuating a first pump for delivering liquid from a liquid supply source 2 through at least one of the outlets 20–30. A multiple pole switching element 34 is connected to the flow measuring element 32 for receiving the first signal therefrom. The switching element 34 has a plurality of preset actuation points and is adapted for comparing said first signal to the actuation points and delivering a second signal in response to said comparison. The switching element 34 can be, for example, Honeywell VutroniK System Monitor Switches.

A relay system 36 is connected to the switching element 34 and the pumps 6, 8, 10, 12 and 14, for receiving the second signal and automatically, sequentially delivering the second signal to a next operable pump of a preselected pump sequence in response to said first signal being representative of a flow rate greater than the flow rate magnitude of the next actuation point of greater magnitude and transferring the second signal along the sequence of pumps to said next operational pump in response to the next pumping sequence being other than an operable pump. An example of an inoperative pump would be one that has been removed from service for repair or other reasons. It should be understood that the use of the word "pump" in this application includes the power means, pump starting apparatus, and impeller for passing the liquid. The word pump has been used herein for simplifying and understanding the apparatus and method of this invention.

Where the flow demands are decreasing, the relay system 36 is also adapted for terminating operation of each pump in response to said first signal being representative of a flow rate less than the flow rate magnitude of the actuation point of the respective last pump actuated. The sequence in which the operation of the pumps is terminated is in the reverse order of the sequence of actuation of the pumps.

The apparatus can be provided with ganged selector switching elements 38. The selector switching element 38 is connected to the relay system 36 and is adapted for varying the preselected actuation sequence of the pumps. Pump 12 can be the first pump actuated, pump 14 the second pump actuated, and pump 6 the third pump actuated during increasing liquid demand, for example.

FIGS. 3A and 3B show an example circuit of this invention. FIGS. 3B is an example circuit of one of the pumps. Each pump will have a like circuit. Only one pump circuit is shown in order to simplify the drawing.

Referring to FIGS. 2, 3A and 3B, an electrical power supply 40 is connected to parallel pressure switch 42 and flow switch 44, which in turn are serially connected to time delay relay 46. Pressure switch 42 is a normally closed switch which for example is actuated to close at a pressure of about 65 psi and actuated to open at a pressure of about 75 psi. The flow switch 44 is a normally open switch which is actuated to close upon the initiation of liquid flow. The pressure and the flow of liquid for operation of the switches 42–44 are sensed at locations along the liquid pathway between the pumping system 48 and the outlets 20–30. The switches 42, 44 can also be a plurality of switches (as shown in FIG. 2) in order to incorporate a redundancy into the system as a safety factor.

Flow switches 50, 52, 54, 56 are connected in parallel to the power source. Each of the flow switches 44, 50, 52, 54 and 56 are normally open switches and are actuated to close in response to receipt of a second signal having a magnitude equal to or greater than a preselected actuation point.

Ready relays contacts 66, 68, 70 and 72 are each connected in parallel to the power source with a transfer relay 76, 78, 80, and 82 serially connected to each respective ready relay contact between the respective ready relay contact and the ground.

Where a ganged selector switching element 38 is desired, respective contacts of the element 38 can be connected to an between respective ready relay contacts and the transfer relay coil. Other contacts of switching element 38 are connected to and between respective transfer relay (TR) contacts and control relay (CR) coil. Said contacts of element 38 are designated (SS). Another set of ready relay contacts can be associated with a visual indicating element such as an indicator light.

Referring to FIG. 3B, a pump power source 86 is provided for each pump 6, 8, 10, 12 and 14. Only one pump circuit is shown for simplicity. It should also be understood that power source 40 and the pump power source 86 can be the same or different sources.

Safety switches can be serially connected to the pump such as phase overload switches 88 and tank low level switch 90, for example.

The pump power source 86 is serially connected to a selector switch 92, such as a three-position hand-operated switch having, for example, hand (H), off (O), and automatic (A) contacts. The hand contact (H) of the switch 92 is serially connected to its respective pump, for example, the first pump 6, for operation of the pump when the selector switch is placed on hand. The automatic contact (A) is connected in parallel to its respective control relay contacts 94 and its respective ready relay coil 65. The control relay contacts 94 are connected in series to respective pump 6 which in turn is connected to ground. Each pump circuit has separate respective control relay contacts 94, 96, 98, 100, and 102 and ready relay contacts 66, 68, 70, 72 and 74 as later more fully described.

In the operation of the system, the system in the non-functioning condition will have the outlets 20–30 closed by valve means (not shown) and liquid will not be delivered to an airplane, for example. In this condition, pressure switch 42 will be open in response to the liquid pressure in the system and flow switch 44 will be open in response to the absence of liquid flow through the system. The remainder of the circuit will be open and none of the pumps will be operating.

Upon initiation of opening one or more of the valves of the outlets 20–30 for delivering a liquid, the pressure in the system will decrease and a liquid will flow through the system. When the pressure decreases below a preselected set point of the pressure switch 42, the switch will close, delivering current to an actuating time delay relay coil 46. The process will first be described where the pumps are all operable and the sequence of start-up is selected to begin with the first pump 6. In this condition, referring to FIGS. 3A and B, the selector switch 92 of each pump will be in the automatic condition, which will actuate the ready relay contacts 66, 68, 70, 72, 74, which in turn will actuate their respective transfer relay coils 76, 78, 80, 82. Actuation of the transfer relay coils 76, 78, 80, 82 will reverse the position of their respective contacts in the transfer relay system 104 and condition the pumping circuits for actuation in response to liquid demands.

Upon closing the pressure switch 42 and actuating time delay relay coil 46, its contacts 106 will close, current will be delivered along line 108 to contacts 110 of transfer relay coil 76 to control relay coil 112. Control relay coil 112 will be actuated closing its contacts 94 which will actuate pump 6 and pass fluid from the pump 6 to the open outlet.

As fluid passes through the system, flow switch 44 will be actuated to close in response thereto, pressure will increase in the system, and pressure switch 42 will be actuated to open. In this condition, power to the first pump switch will be dependent upon the continuation of liquid flow which actuates flow switch 44. So long as the flow continues, flow switch 44 will be in a closed position resulting in the continuation of operation of the first pump 6.

In the situation where, for example, another outlet is opened increasing the flow of liquid from the system, a first signal delivered by element 32 will increase to a magnitude at or greater than the actuation set point of a second flow switch 50 which in turn will close and actuate the second pump 8 through its associated control relay 114.

Progressively, sequentially as the first signal of element 32 is increased to a magnitude equal to or greater than the associated actuation points of the flow switches 52, 54, 56, said switches will close and actuate their respective pumps 10, 12, 14 through their respective control relays 116, 118, 120.

In a situation where the flow of liquid decreases, the first signal will decrease in magnitude. When the first signal reaches a magnitude less than the magnitude of the actuation point of the flow switch (56, for example) of the last actuated pump 14, said switch 56 will open which will terminate the operation of the fifth pump 14, for example. Continued decrease in the flow rate responsive to fluid demand will sequentially terminate the operation of the pumps in the reverse of the sequence in which they were actuated.

Often it is necessary or desirable to perform maintenance or repair work on an individual pump which necessitates removing a pump from an actuatable condition. This can be accomplished by moving a respective selector switch 92 to the off (O) position. At this position, current cannot be delivered to the pump. This invention is then adapted to sequentially actuate and deactuate the pumps in response to increased or decreased liquid flow while skipping over or bypassing the pump which has been taken out of service.

In order to more fully describe this method or scheme of operation, it will be assumed that the third pump 10 has been taken out of service for repair.

From the at rest condition, opening of an outlet and initiation of the operation of the first pump 6 will proceed as set forth above. Because the pump circuit of the third pump 10 is open, however, the ready relay coil of that pump circuit will not be energized, hence the associated ready relay contacts 70 will remain open which in turn will not permit its associated transfer relay coil 80 to actuate its associated transfer relay contacts 122, 124, 126, 128, and 130 of the transfer relay system 104. When said contacts 122, 124, 126, 128, and 130 are not actuated by element 80, said contacts will remain in the condition shown in FIG. 3A.

As the liquid flow rate increases, pump No. 2 will be actuated as set forth above. Still further increase in the liquid flow rate will cause the first signal to reach a magnitude at or above the magnitude of the actuation point of the third pump which will cause a second signal to be delivered which in turn will cause the third flow switch 52 to close and current will be delivered along the line 132. Transfer relay contacts 133, 134 on line 132 have been closed by the actuation of their respective transfer relay coils 76 and 78. Current thus reaches point 136 of the relay system 104.

Since transfer relay contacts 122 are open and transfer relay contacts 124 are closed in response to transfer relay coil 80 not being actuated, the current flows through transfer relay contacts 124, through line 138 to control relay coil 118 which causes the fourth pump to be actuated. Since the fourth pump was operable, its associated transfer relay coil 82 caused its associated transfer relay contacts 140 on line 138 to be closed, thus completing the circuit through line 138.

In the operation of this invention, it can therefore be seen that one or more pumps can be taken out of service and the system will continue to automatically maintain the liquid flow rate of each outlet up to the capacity of all available pumps within a preselected range during discharge of liquid from the outlets and during variations of the total rate of liquid being discharged. The ganged selector switching element 38 can also be manipulated to change the sequence of pump actuation, thereby providing a means whereby the pump wear can be evenly distributed or other operational conditions maintained.

Other modifications and alterations of this invention will become apparent to those skilled in the art from the foregoing discussion and accompanying drawings and it should be understood that this invention is not to be unduly limited thereto.

That which is claimed is:

1. A method for delivering a liquid from a liquid supply source to a plurality of outlets while automatically maintaining the liquid flow rate from each outlet within a preselected range during discharge of liquid from at least one of the outlets and during variations of the total rate of liquid being discharged from the outlets, comprising:

measuring the flow rate of the liquid passing to the outlets and delivering a first signal representative of and in response to said measured flow rate;

comparing said first signal to a plurality of preset actuation points and delivering an actuation signal in response to said comparison;

automatically actuating the next operable pump of a preselected pump sequence in response to said actuation signal being representative of the first signal being of a magnitude greater than the flow rate magnitude of the next actuation point, said actuation signal being transferred along the sequence of pumps to said next operable pump in response to the next pump in the sequence being other than operable;

automatically terminating operation of a particular pump and actuating a next operable pump of the preselected pump sequence in response to the operation of a safety switch associated with said particular pump; and automatically terminating operation of each pump in response to said first signal being representative of a flow rate less than the flow rate magnitude of the actuation point of the respective operating pump, the order of said termination being in the reverse of the sequence of the pump actuation.

2. A method, as set forth in claim 1, wherein all of the pumps of the system have a substantially equal capacity.

3. A method, as set forth in claim 2, wherein the flow rate magnitude between successive actuation points is of a substantially common magnitude.

4. A method, as set forth in claim 2, wherein the flow rate magnitude between successive actuation points is in the range of about 50 to about 100 percent of the capacity of each pump.

5. A method, as set forth in claim 1, wherein the preselected actuation sequence can be varied.

6. In a system for passing liquid from a liquid supply source through a plurality of outlets while varying the total rate of liquid being discharged from the outlets, said system having a plurality of pumps connected to the liquid supply source and the outlets, means for measuring the flow rate of the liquid passing to the outlets and delivering a first signal representative of and in response to said measured flow rate, and means for actuating a first pump for delivering liquid from the liquid supply source through at least one of the outlets, the improvement comprising:

first means for comparing said first signal to the plurality of preset actuation points and delivering a second signal in response to said comparison, said second signal being representative of the magnitude of said first signal relative to the magnitude of said actuation points;

second means for automatically, sequentially delivering the second signal to a next operable pump of a preselected pump sequence in response to said first signal being representative of a flow rate greater than the flow rate magnitude of the next actuation point of greater magnitude and transferring the second signal along the sequence of pumps to said next operational pump in response to the next pump in sequence being other than an operable pump and for terminating operation of each pump in response to said first signal being representative of a flow rate less than the flow rate magnitude of the actuation point of the respective last pump actuated, the order of said termination being in the reverse of the sequence of actuation; and third means for automatically terminating operation of a particular pump and actuating a next operable pump of the preselected pump sequence in response to the operation of a safety switch associated with said particular pump.

7. An apparatus, as set forth in claim 6, wherein the first means comprises an electronic monitor switch operably connected to the flow rate-signal means.

8. An apparatus, as set forth in claim 6, wherein the second and third means comprises a plurality of transfer relays and associated flow switches operably connected to the pumps.

* * * * *